(12) United States Patent
Chia et al.

(10) Patent No.: US 7,000,149 B1
(45) Date of Patent: Feb. 14, 2006

(54) EXTERNAL LOOPBACK TEST MODE

(75) Inventors: Veechoong "Jonas" Chia, San Jose, CA (US); Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 648 days.

(21) Appl. No.: 10/273,639

(22) Filed: Oct. 18, 2002

(51) Int. Cl.
*G06F 11/00* (2006.01)

(52) U.S. Cl. .......................... 714/37; 714/716
(58) Field of Classification Search ............... 714/41, 714/715, 716
See application file for complete search history.

(56) References Cited

U.S. PATENT DOCUMENTS

| | | | | |
|---|---|---|---|---|
| 5,521,904 A | * | 5/1996 | Eriksson et al. | 370/249 |
| 5,640,401 A | * | 6/1997 | Yamada | 714/716 |
| 5,805,571 A | * | 9/1998 | Zwan et al. | 370/249 |
| 5,854,816 A | * | 12/1998 | Kim et al. | 375/376 |
| 5,862,177 A | * | 1/1999 | Cummings et al. | 375/224 |
| 6,659,426 B1 | | 12/2003 | Schroeder et al. | |
| 6,667,959 B1 | | 12/2003 | Hebb et al. | |
| 6,766,466 B1 | | 7/2004 | Jibbe | |
| 6,928,528 B1 | * | 8/2005 | Hewitt | 711/156 |

* cited by examiner

*Primary Examiner*—Robert Beausoliel
*Assistant Examiner*—Michael Maskulinski
(74) *Attorney, Agent, or Firm*—Meyertons Hood Kivlin Kowert & Goetzel, P.C.; B. Noël Kivlin; Erik A. Heter

(57) ABSTRACT

A method and apparatus for testing the transmitter and receiver links of an I/O node. A test mode in an I/O node is initiated by a test signal driven from a test system to the I/O node via a loadboard. The I/O node may then receive test data through a peripheral bus interface. The inputting may be performed synchronously to a first clock signal. The I/O node may then transmit the test data to a receiver via a loopback mechanism on the loadboard. The transmission and reception of test data between transmitter and receiver is synchronous to a second clock signal, which has a frequency equal to the operational frequency of the transmitter and receiver. The receiver may forward the test data to the peripheral bus interface, which may in turn output the test data to the test system. The test system may then determine the results of the test.

24 Claims, 6 Drawing Sheets

EXTERNAL LOOPBACK TEST MODE

BACKGROUND OF THE INVENTION

1. Field of the Invention

This invention relates to electronic circuits, and more particularly, to the testing of electronic circuits.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

As computer system technology has advanced, the operating speed of various bus bridging devices has increased dramatically. Bus speeds on computer system motherboards have increased correspondingly, thereby increasing the efficiency at which computer systems can process transactions.

One drawback to the use of high-speed bus bridging devices is reduced testability. Bus bridging devices are typically implemented as integrated circuits mounted within a package. These integrated circuit packages successfully pass production tests before they may actually be used in a computer system. However, many production test systems are incapable of sending or receiving test data at the same speeds at which the bus bridging devices normally operate. This drawback makes it difficult to verify that the external interfaces of the bus bridging device will operate properly when placed in a computer system, as some may pass test at lower speeds but fail to properly function at higher speeds. Conversely, test systems that can function at higher speeds are typically much more expensive than testers configured for testing lower speed devices.

Additional problems may be created by the nature of the device tested. In devices that have a clock forwarding architecture, they problem of accumulated phase error may make it difficult, if not impossible to test the device on a clock synchronous tester. Devices having a clock forwarding architecture may encounter phase slippage during their operation, and this phase slippage may cause the clock and data signals to drift by one or more bit time. Since the clock and data signals are transmitted at the same time, the operation of the device may not be affected by the phase slippage. However, when testing the device on a synchronous tester, phase slippage may cause false failures. Thus, the false failures resulting from phase slippage, along with operational speeds that exceed the capabilities of most testers result in devices that may be untestable.

SUMMARY OF THE INVENTION

A method and apparatus for testing the transmitter and receiver links of an I/O node is disclosed. In one embodiment, a test mode in the I/O node may be initiated by a test signal driven from a test system. The I/O node may be coupled to the test system by a loadboard, and may receive the test signal through a peripheral bus interface. The I/O node may also receive test data through the peripheral bus interface. The inputting of both the test signal and the test data may be performed synchronously to a first clock signal. Responsive to entering the test mode and receiving the test data, the I/O node may transmit the test data onto a loopback mechanism on the loadboard. The loopback mechanism may couple a transmitter of the I/O node to a receiver of the I/O node. The test data may be transmitted by the transmitter, onto the loopback mechanism, and to the receiver. The transmission and reception of test data between transmitter and receiver may be synchronous to a second clock signal. The second clock signal may have a frequency greater than the first clock signal. Responsive to the receiving of the test data via the loopback mechanism, the receiver may forward the test data to the peripheral bus interface, which may in turn output the test data to the test system. The test system may then determine the results of the test.

In one embodiment, the frequency of the second clock signal may be the frequency at which the transmitter and the receiver are designed to operate in their intended environment. This frequency may be greater than the frequency of the first clock signal, and may exceed the maximum frequency at which the test system is capable of operating. The peripheral bus interface may be configured to operate at the frequency of the first clock signal. The frequency of the first clock signal is within the capabilities of the test system in order that the test signal and test data may be both input to and output from the I/O node.

Thus, the method of testing the transmitter-receiver links described herein may allow for testing at full speed despite the fact even if when the clock speed exceeds the maximum clock speed. This in turn may allow the utilization of a lower cost test system than might otherwise be required for full speed testing of the transmitter-receiver links. The test system may verify that the transaction between the transmitter and receiver is successful via the peripheral bus interface, which operates at a lower frequency that is within the test system's capabilities. Furthermore, since the transactions are observed in the clock domain of peripheral bus interface instead of the clock domain of the transmitter-receiver links, the problem of accumulated phase error does not affect the test results.

BRIEF DESCRIPTION OF THE DRAWINGS

Other aspects of the invention will become apparent upon reading the following detailed description and upon reference to the accompanying drawings in which.

Figure 1:
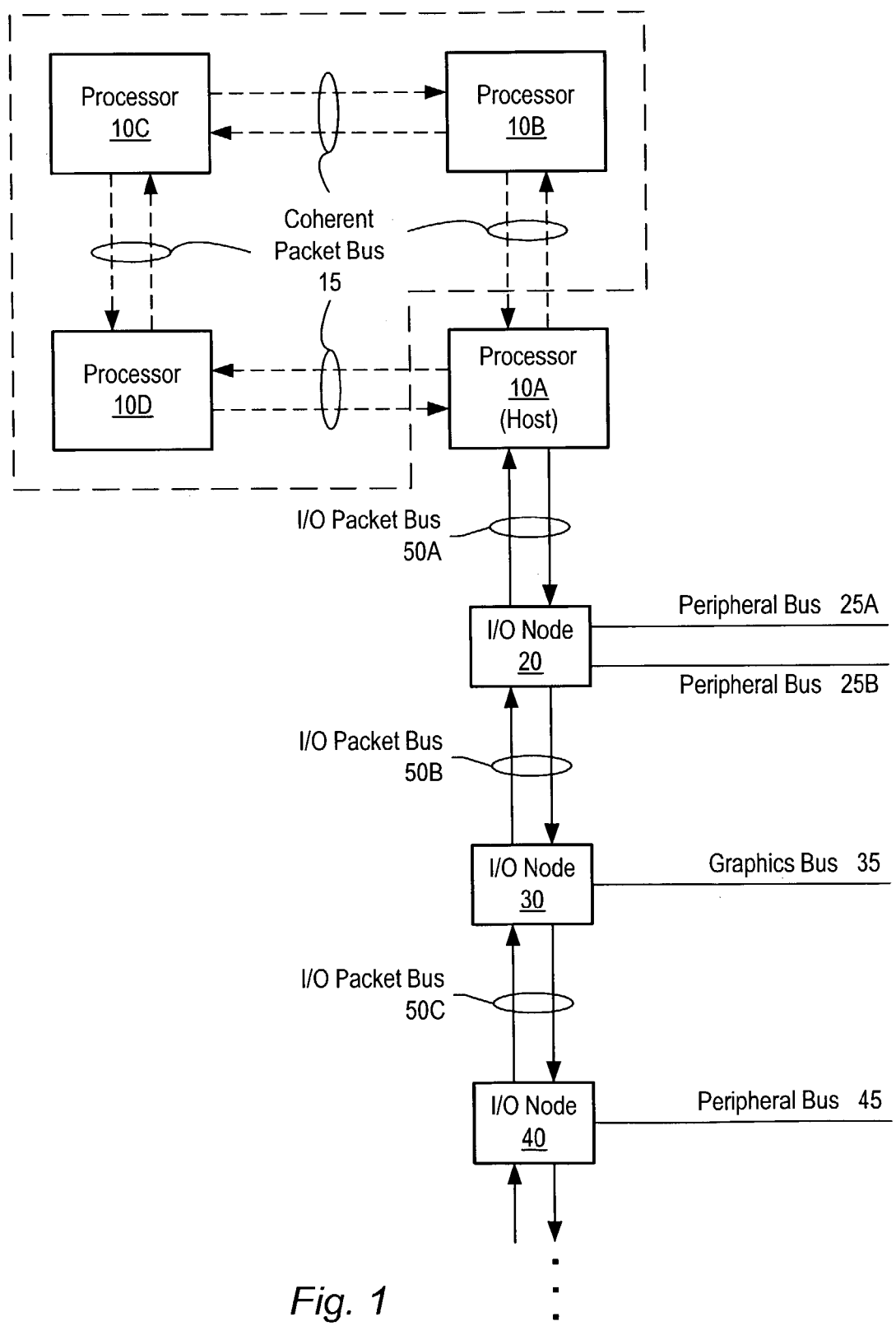
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system is shown. The computer system includes processors 10A–10D each interconnected by a coherent packet bus 15. Each section of coherent packet bus 15 may form a point-to-point link between each of processors 10A–D. While four processors are shown using point-to point links it is noted that other numbers of processors may be used and other types of buses may interconnect them. The computer system also includes three I/O nodes numbered 20, 30 and 40 each connected together in a chain by I/O packet buses 50B and 50C respectively. I/O packet bus 50A is coupled between host node/processor 10A and I/O node 20. Processor 10A is illustrated as a host node which may include a host bridge for communicating with I/O packet bus 50A. Processors 10B–D may also include host bridges for communication with other I/O packet buses (not shown). The communication links formed by I/O packet bus 50A–C may also be referred to as a point-to-point links. I/O node 20 is connected to a pair of peripheral buses 25A–B. I/O node 30 is connected to a graphics bus 35, while I/O node 40 is connected to an additional peripheral bus 45.

Processors 10A–10D are each illustrative of, for example, an x86 microprocessor such as an Athlon™ microprocessor. In addition, one example of a packet bus such as I/O packet bus 50A–50C may be a non-coherent HyperTransport™. Peripheral buses 25A–B and peripheral bus 45 are illustrative of a common peripheral bus such as a peripheral component interconnect (PCI) bus. Graphics bus 35 is illustrative of an accelerated graphics port (AGP), for example. It is understood, however, that other types of microprocessors and other types of peripheral buses may be used.

It is noted that while three I/O nodes are shown connected to host processor 10A, other embodiments may have other numbers of nodes and those nodes may be connected in other topologies. The chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

During operation, I/O node 20 and 40 may translate PCI bus transactions into upstream packet transactions that travel in I/O streams and additionally may translate downstream packet transactions into PCI bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. As used herein, "upstream" refers to packet traffic flow in the direction of the host bridge of processor 10A and "downstream" refers to packet traffic flow in the direction away from the host bridge of processor 10A. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. Since I/O node 20 may not forward packets to a peripheral device on peripheral bus 25 from downstream, the packets are transmitted upstream to the host bridge of processor 10A. The host bridge of processor 10A may then transmit the packets back downstream with a Unit ID of the host bridge of processor 10A until I/O node 20 recognizes and claims the packet for the peripheral device on peripheral bus 25. I/O node 20 may then translate the packets into peripheral bus transactions and transmit the transactions to the peripheral device on peripheral bus 25.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

As will be described in greater detail below, to preserve the ordering rules of the various buses that may be connected to an I/O node, the I/O node may provide transaction reordering as well as packet buffering. The I/O node may also include control logic which controls the flow of packets into and out of the tunnel by both forwarded and injected traffic.

Figure 2:
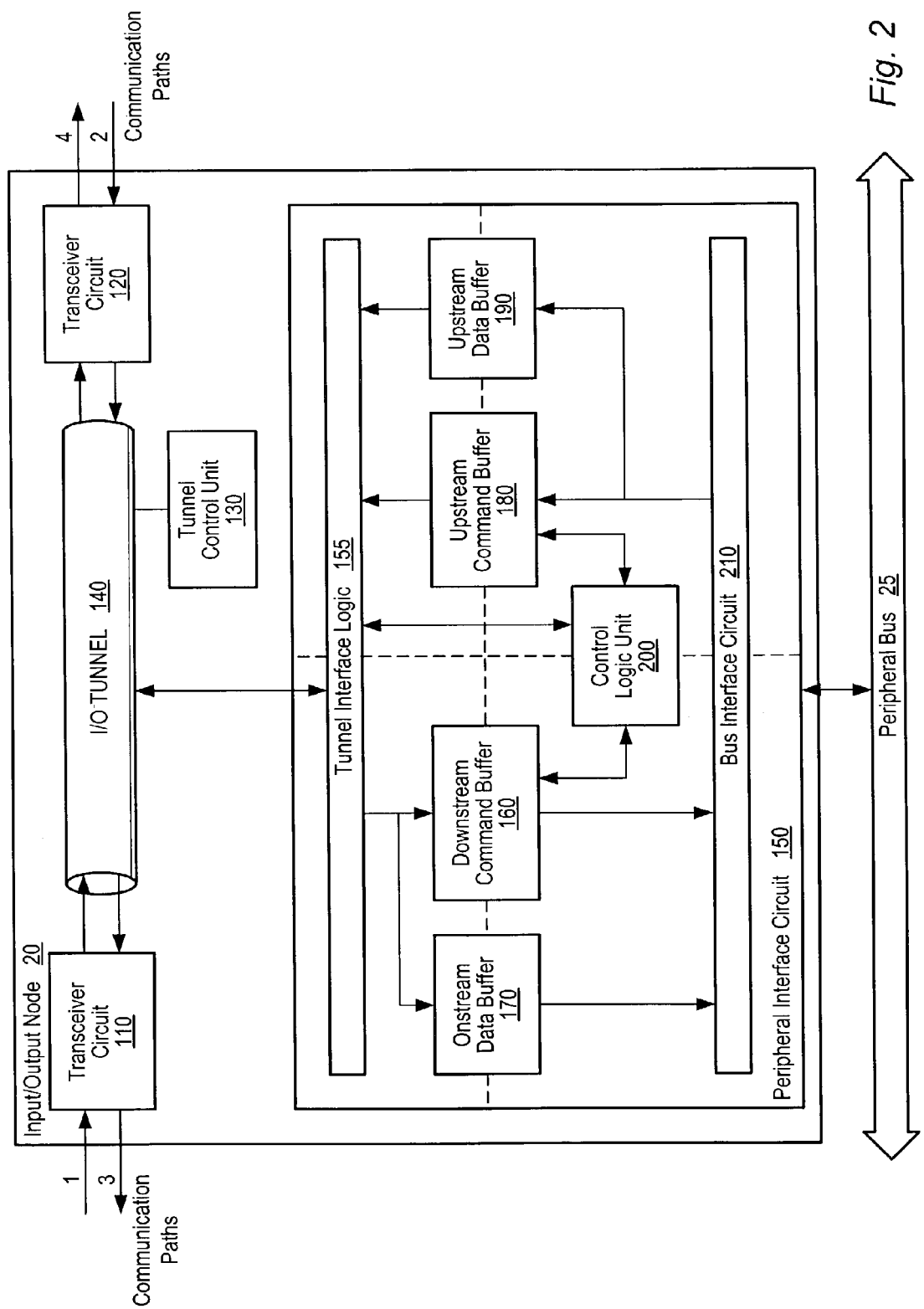
FIG. 2 is a block diagram of one embodiment of an I/O node.

Referring to FIG. 2, a block diagram of one embodiment of an I/O node is shown. The I/O node is representative of I/O node 20, 30 or 40 of FIG. 1 and will hereafter be referred to as I/O node 20 for simplicity. I/O node 20 of FIG. 2 includes a transaction receiver 110 which is coupled to a transmitter 140 via a command bus 111 and to peripheral interface 150 via a command bus 112. I/O node 20 also includes a transaction receiver 120 which is coupled to a transmitter 130 via a command bus 121 and to peripheral interface 150 via a command bus 122. Peripheral interface 150 is also coupled to transmitters 130 and 140 via a command bus 151 and to peripheral bus 152. Additionally, I/O node 20 includes a transaction control unit 100 which is coupled to each receiver, each transmitter and to peripheral interface via a control command bus 101. As used herein, a command bus is meant to include signals for command, control and data. Therefore, when a transaction or a command is said to be sent over a respective command bus it is meant to include command and data bits.

In the illustrated embodiment, receiver 110 and transmitter 140 form one communication path of the I/O tunnel and receiver 120 and transmitter 130 form a second communication path of the I/O tunnel. Since each of the communication paths is uni-directional, either path may be connected as the upstream or downstream path. Thus, the injected traffic from peripheral interface 150 is provided to either of transmitters 130 and 140.

Receivers 110 and 120 each receive packet transactions into a receive buffer (not shown). As each transaction is received, a control command is generated containing a subset of the information contained in the received command. The control command may include the Unit Id of the originating node, destination information, a data count and transaction type, for example. It is noted that the control command may include other information or may not include some of the information listed here. The control command is sent to transaction control unit 100. In addition, receivers 110 and 120 may also include logic (not shown) which signals whether or not there is free space in the receive buffer.

In response to peripheral interface 150 receiving transactions from peripheral bus 152, peripheral interface 150 may also generate control commands containing information similar to the control command described above. Peripheral interface 150 may also store the transactions in one or more buffers and send the control commands to transaction control unit 100.

Transaction control unit 100 may store each control command that it receives into one or more buffer structures in the order that they were received. Based on the control commands that transaction control unit 100 stores in its buffers, transaction control unit 100 may decide the order that the corresponding commands waiting in source buffers (i.e. receiver and/or peripheral interface) may be sent. As will be described in greater detail below in conjunction with FIG. 3 through FIG. 6, transaction control unit 100 may arbitrate between transactions in its buffers based on such factors as the type of transaction, whether there is free buffer space at the transmitter and destination, whether the transaction is forwarded traffic or injected traffic. Thus the transaction control unit 100 may be responsible for the overall flow of transactions through the tunnel of an I/O node.

Once transaction control unit 100 arbitrates which transaction will be processed, transaction control unit 100 may direct the respective source device to send a pending transaction to the destination device. For example, the transaction control unit 100 selects a control command from its buffer that is representative of a transaction being forwarded from receiver 110 to transmitter 140. Transaction control unit 100 notifies receiver 110 to send the transaction to transmitter 140 via command bus 111. Transmitter 140 may then transmit the transaction to the next node in the chain. The next node may be another I/O node which is either upstream or downstream, or it may be a host node such as host processor 10A of FIG. 1.

Figure 3:
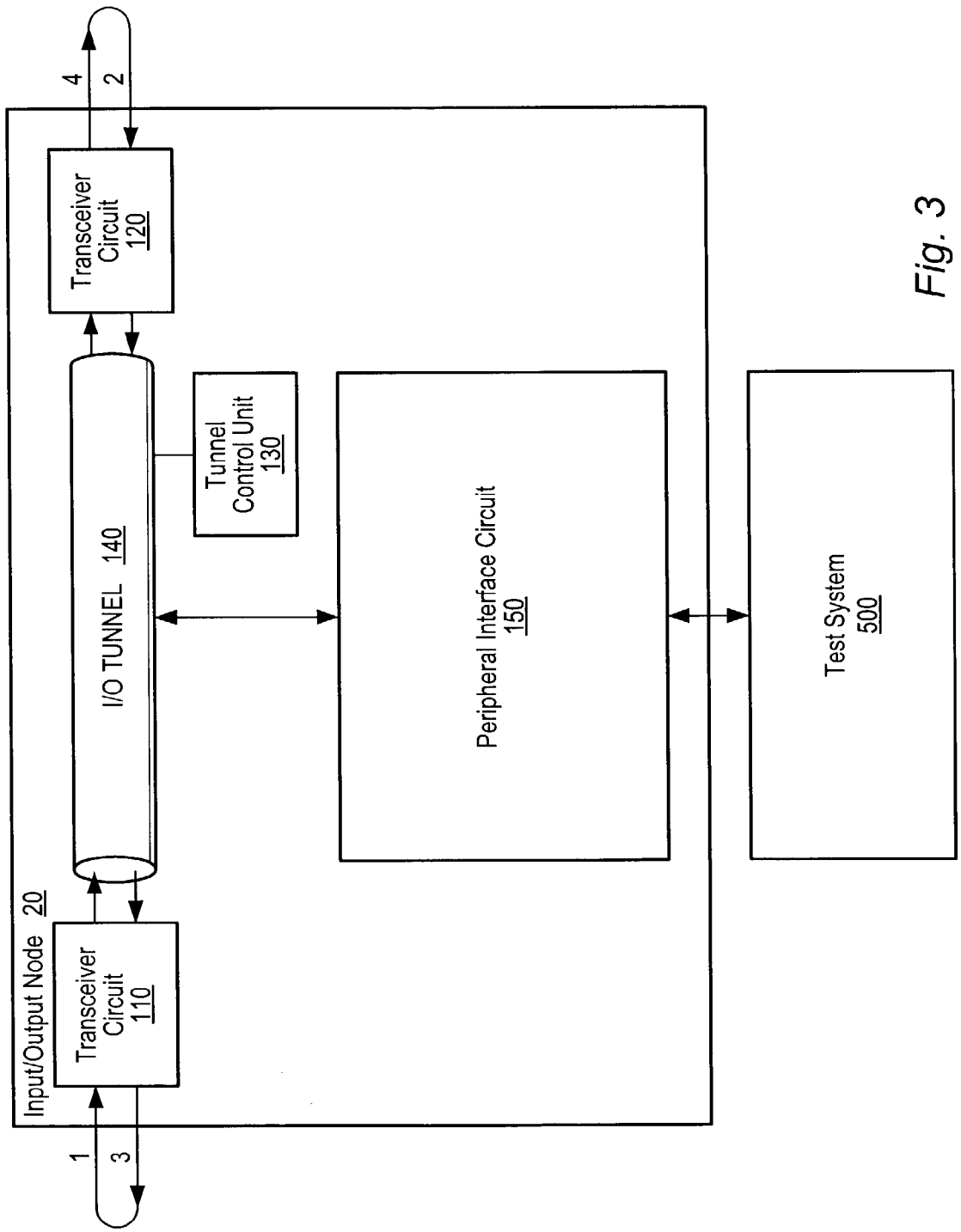
FIG. 3 is a block diagram of one embodiment of an I/O node configured for testing in an external loopback mode.

FIG. 3 is a block diagram illustrating one embodiment of an I/O node coupled to a test system and configured for testing in an external loopback mode. In the embodiment shown, I/O node 20 may be coupled to test system 500 by peripheral interface circuit 150. A loadboard (to be discussed in further detail below) may also be present. As previously noted, I/O node 20 may include transceiver circuits 110 and 120, each of which may include a transmitter and a receiver for transmitting/receiving signals on a packet bus, such as packet bus 50A shown in FIG. 1. The transceiver circuits may be coupled to peripheral interface circuit 150 by I/O tunnel 140.

Peripheral interface circuit 150 may be configured to coupled I/O node 20 to a peripheral bus. The peripheral bus to which peripheral interface circuit 150 is designed to be coupled may be one of several different types of commonly used peripheral buses. These buses include, but are not limited to, peripheral component interconnect (PCI), PCIX (extended PCI), advanced graphics port (AGP), general purpose instrument bus (GPIB), and so on. Peripheral interface circuit 150 may operate at a first clock frequency, which may be compatible with the capabilities of test system 500. The particular type of peripheral bus supported may determine the speed at which peripheral interface circuit 150 operates.

In order to conduct the testing of transmitter-receiver links, I/O node 20 may be placed into a test mode. In one embodiment, test system 500 may drive a test signal to I/O node 20. I/O node 20 may be placed into a test mode responsive to test system 500 driving the test signal. Following the driving of the test signal, test system 500 may transfer test data to peripheral interface circuit 150. Both the driving of the test signal and the transferring of test data may be conducted synchronous to the clock signal of the frequency at which peripheral interface circuit 150 operates.

Following the transfer of test data from test system 500 to peripheral interface circuit 150, the test data may be transferred to the transmitter of one of transceiver circuits 110 or 120, depending upon which transmitter receiver link is to be tested. During the transfer of the test data from peripheral interface circuit 150 to one of the transceiver circuits, the data may be shifted into a different clock domain. In one embodiment, peripheral interface circuit 150, I/O tunnel 140, and transceiver circuits 110/120 may operate in different clock domains from each other.

Once the test data is in the clock domain of one of transceiver circuits 110/120, it may be transmitted onto a loopback mechanism. In the embodiment shown, a loopback mechanism may be configured such that the transmitter of transceiver circuit 110 may transmit the test data to the receiver of the transceiver circuit. Similarly, transceiver circuit 120 may transfer test data from its transmitter to its receiver through a loopback mechanism to which it may be coupled. It should be noted that embodiments are possible and contemplated wherein the transmitter of transceiver 110 is coupled to the receiver of transceiver 120, and vice versa.

Transmission and reception of test data by transceivers 110/120 may be conducted at their normal clock speed, which may be significantly greater than the speed at which test system 500, peripheral interface circuit 150, and I/O tunnel 140 may operate. For example, in one embodiment, the tester may have a maximum clock speed of 200 MHz, which may be the operating speed of peripheral interface circuit 150. Transceiver circuits 110/120, on the other hand, may operate at 800 MHz, which is beyond the capability of test system 500 in this example. The clock signal to which transceiver circuits 110/120 are synchronized may be generated within I/O node 20 by one or more phase locked loops (not shown). Since the clock signal is generated on board I/O node 20 and transmitted along with data from transceiver circuits 110/120, accumulated phase error does not affect the operation of the receiver circuit, since both the clock and data will drift together.

Following the reception of test data, the transceiver circuit under test may transfer the test data back to peripheral interface circuit 150 via I/O tunnel 140. As with the movement of data to one of transceiver circuits 110/120, the test data may be shifted from one clock domain to another as it is conveyed to peripheral interface circuit 150. Once the test data has been received by peripheral interface circuit 150 from I/O tunnel 140, it may be transferred to test system 500. Transfers of test data from peripheral circuit 150 to test system 500 may be conducted at the same clock speed in which test data was originally transferred to I/O node 20.

After test data has been transferred back into test system 500, the results of the testing operations may be determined. Determining the test results may include a simple pass/fail determination. Other types of testing are also possible and contemplated. In general, any type of testing may be conducted in order to determine the functionality and/or performance of the transmitter links.

Figure 4A:
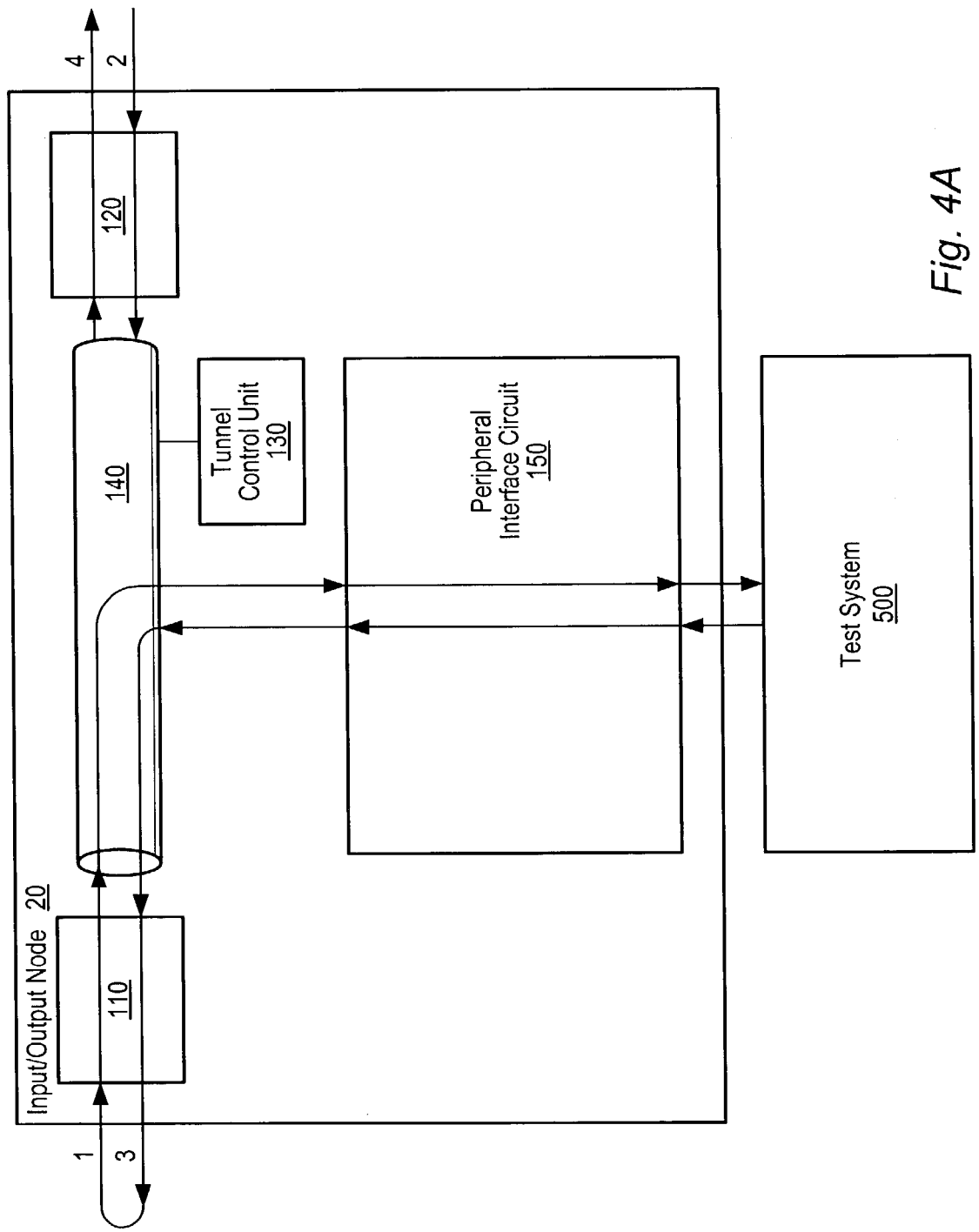
FIG. 4A is a block diagram of one embodiment of an I/O node illustrating the flow of test data through a first side of the I/O node.
Figure 4B:
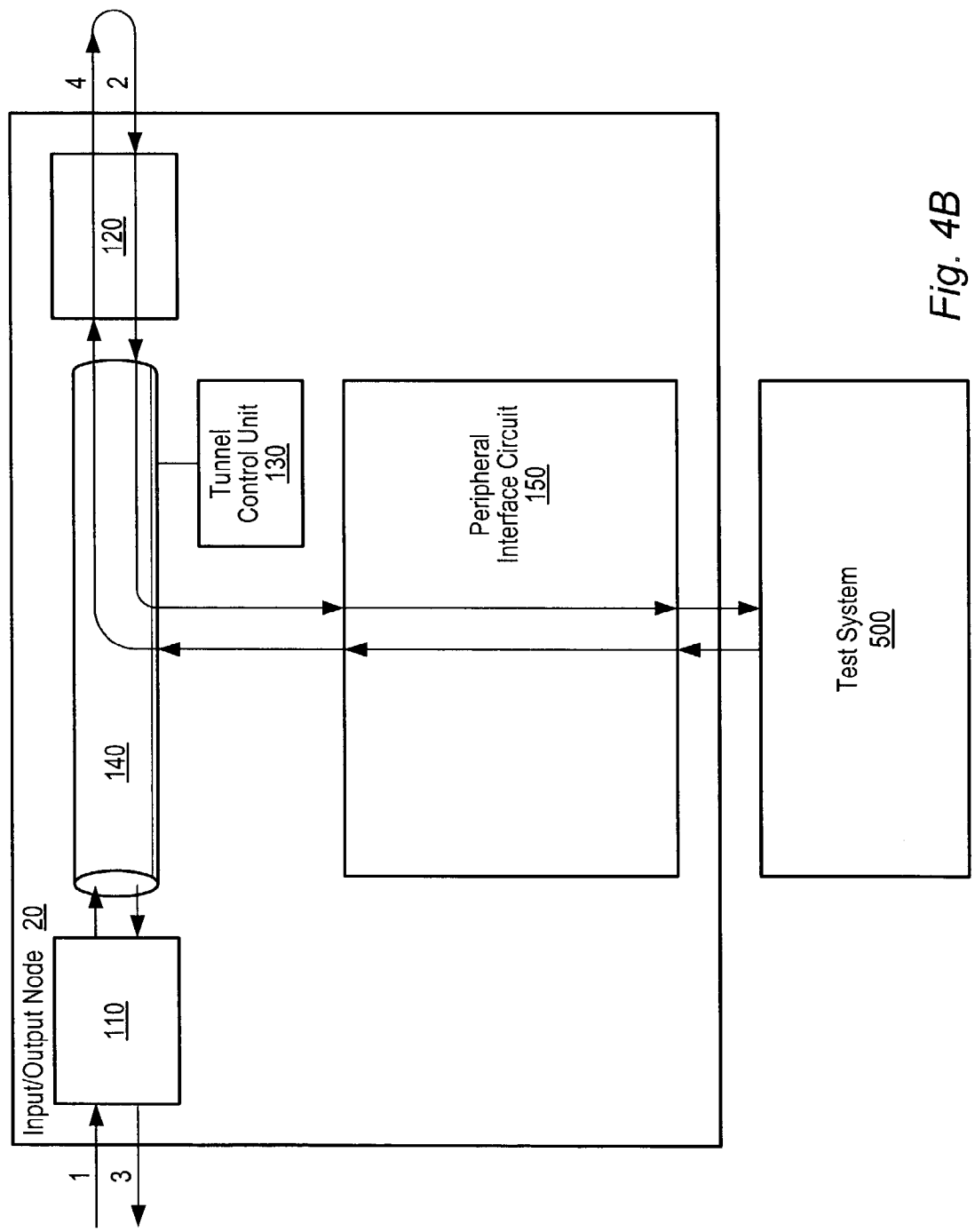
FIG. 4B is a block diagram of one embodiment of an I/O node illustrating the flow of test data through the second side of the I/O node.

FIGS. 4A and 4B illustrate the flow of test data through the I/O node. More particularly, FIG. 4A illustrates the data flow when testing a transmitter-receiver link involving transceiver circuit 110, while FIG. 4B illustrates the flow of data when testing a transmitter receiver link involving transceiver circuit 120. In general, the test data flows from test system 500, through peripheral interface circuit 150, into I/O tunnel 140, into one of transceiver circuit 110 or 120, through the loopback mechanism, into a receiver of one of transceiver circuits 110 or 120, back into I/O tunnel 140, into peripheral interface circuit 150, and finally, to test system 500.

As noted above, during normal operations, some traffic may pass through I/O tunnel 140 from one transceiver to the other. However, when the test mode is active, tunnel control circuit 130 may be configured to re-route any incoming traffic received in the receiver of one of transceiver circuits 110/120 to peripheral interface circuit 150. During normal operations, traffic may pass through I/O tunnel or to peripheral interface circuit 150 in accordance with its specified destination.

Figure 5:
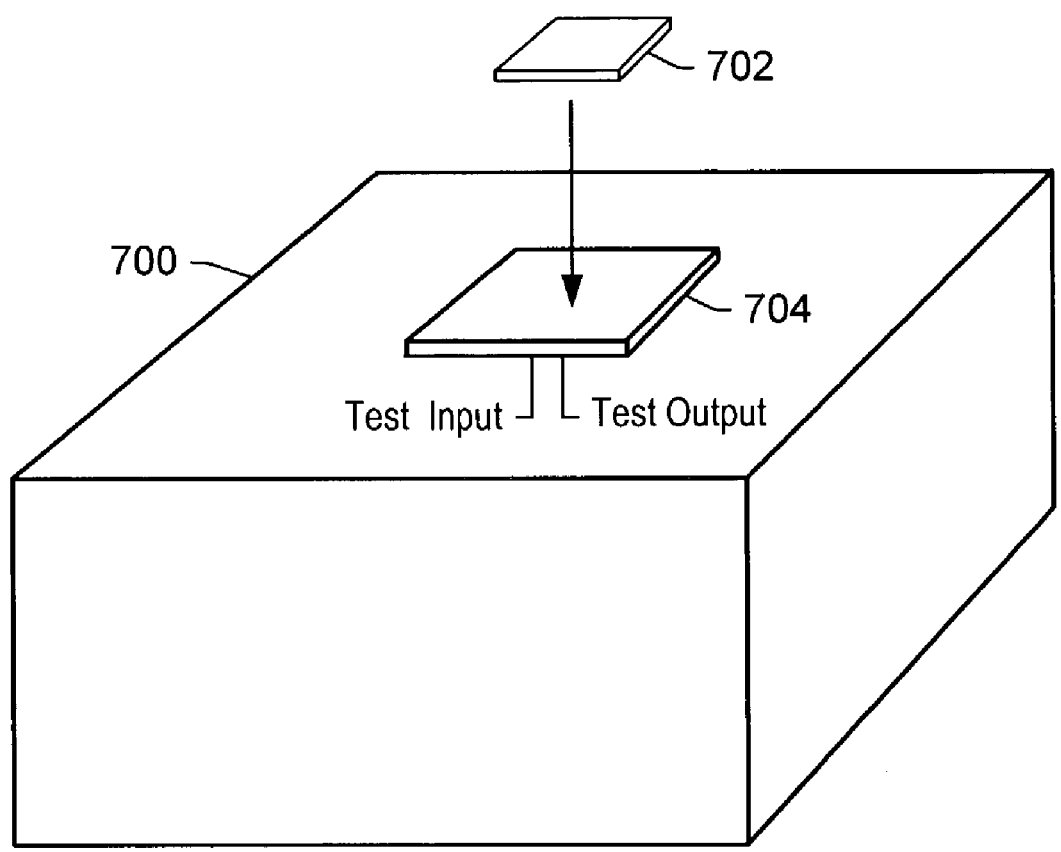
FIG. 5 is a perspective view of one embodiment of an integrated circuit test system.

Turning now to FIG. 5, a perspective view of one embodiment of an integrated circuit test system. Test system 700 may be configured to perform testing on device under test (DUT) 702. In one embodiment, DUT 702 may be an integrated circuit such as I/O node 20. In other embodiments, DUT 702 may be virtually any type of integrated circuit that may be tested on a production tester. Test system 700 may include a loadboard 704, which may be configured to allow DUT 702 to be coupled to test system 700. Loadboard 704 may couple DUT 702 to power and ground connections. Loadboard 704 may also allow test system 700 to provide a reference clock signal to DUT 702.

Testing may be performed by inputting test vectors into DUT 702 and reading out test data, which may be produced responsive to the input test vectors. Comparison of the test data to expected results may be performed in order to determine whether DUT 702 has successfully passed the test. The type of testing conducted may include the testing of transmitter and receiver links as described above. Loadboard 704 may include a loopback mechanism in order to facilitate this testing. The loopback mechanism may include one or more circuit traces, depending upon the width of the bus to which the transceiver circuits are coupled. In one embodiment, the bus width associated with the transceiver circuits of I/O node 20 may be 8 bits, and may include circuit traces for conveying data and control information. The loopback mechanism may also include one or more relays in embodiments where it may be desired to break the data path or perform tests that may involve masking.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for testing transmitter and receiver links of an I/O node, the method comprising:

initiating a test mode by driving a test signal to the I/O node inputting test data into the I/O node through a peripheral bus interface, wherein the peripheral bus interface is operatively coupled to a test system, and wherein inputting the test data is performed synchronous to a first clock signal;

transmitting the test data from a transmitter of the I/O node, wherein transmitting the test data is performed synchronous to a second clock signal, the second clock signal having a frequency greater than the first clock signal;

receiving the test data in a receiver of the I/O node, wherein during said testing, the receiver of the I/O node is coupled to the transmitter by the loopback mechanism;

outputting the test data from the I/O node through the peripheral bus interface; and determining results of said testing, said determining performed by the test system.

2. The method as recited in claim 1, wherein the frequency of the second clock signal is the operational frequency of the transmitter and receiver.

3. The method as recited in claim 1, wherein the I/O node is operatively coupled to the test system through a loadboard.

4. The method as recited in claim 2, wherein the loopback mechanism is implemented on the loadboard.

5. The method as recited in claim 4, wherein the loopback mechanism is implemented with at least one circuit trace.

6. The method as recited in claim 5, wherein the loopback mechanism includes at least one relay.

7. The method as recited in claim 1, wherein the I/O node includes an I/O tunnel, a transceiver circuit is coupled to the I/O tunnel, wherein the transceiver circuit includes the transmitter and the receiver.

8. The method as recited in claim 7, wherein the I/O tunnel is coupled to the peripheral bus interface.

9. The method as recited in claim 8, during test mode, wherein data received by the receiver is routed to the peripheral bus interface.

10. The method as recited in claim 1, wherein said outputting is performed synchronous to the first clock signal.

11. A system for testing transmitter and receiver links of an I/O node, the system comprising:

a test system and a loadboard coupled to the test system, wherein the loadboard is configured to operatively couple the I/O node to the test system;

wherein the test system is configured to initiate a test mode by driving a test signal to the I/O node and input test data into the I/O node through a peripheral bus interface, wherein inputting test data is performed synchronous to a first clock signal; wherein the I/O node is configured to transmit the test data from a transmitter, through a loopback mechanism on the loadboard, to a receiver in the I/O node, wherein transmitting and receiving the test data are performed synchronous to a second clock signal, the second clock signal having a frequency greater than the first clock signal, and wherein the I/O node is further configured to output the test data to the test system through the peripheral bus interface responsive to the receiver receiving the test data; and wherein the test system is further configured to determine the results of said testing.

12. The system as recited in claim 11, wherein the frequency of the second clock signal is the operational frequency of the transmitter and receiver.

13. The system as recited in claim 11, wherein the loopback mechanism is implemented with at least one circuit trace on the loadboard.

14. The system as recited in claim 13, wherein the loopback mechanism includes at least one relay.

15. The system as recited in claim 11, wherein the I/O node includes an I/O tunnel, wherein a transceiver circuit is coupled to the I/O tunnel, and wherein the transceiver circuit includes the transmitter and the receiver.

16. The system as recited in claim 15, wherein the peripheral bus interface is coupled to the I/O tunnel.

17. The system as recited in claim 15, wherein, during the test mode, data received by the receiver is routed to the peripheral bus interface.

18. The system as recited in claim 11, wherein outputting the test data is performed synchronous to the first clock signal.

19. The system as recited in claim 11, wherein the peripheral bus interface is an advanced graphic port (AGP) interface.

20. The system as recited in claim 11, wherein the peripheral bus interface is a peripheral component interconnect (PCI) interface.

21. An I/O node comprising:
   a transceiver circuit including a transmitter and a receiver;
   an I/O tunnel circuit coupled to the transceiver circuit; and
   a peripheral bus interface coupled to the I/O tunnel;
   wherein the I/O node is configured to enter a test mode responsive to receiving a test signal through the peripheral bus interface, the test signal received from a test system, and further configured to receive test data from the test system through the peripheral bus interface;
   wherein, responsive to receiving test data from the test system, the I/O node is configured to transmit the test data from the transmitter onto a loopback mechanism, and further configured to receive the test data at the receiver through the loopback mechanism, and responsive to receiving the test data at the receiver, to output the test data to the test system through the peripheral bus interface.

22. The I/O node as recited in claim 21, wherein the I/O node further includes a second transceiver circuit including a second transmitter and a second receiver, the second transceiver circuit coupled to the I/O node.

23. The I/O node as recited in claim 21, wherein the peripheral bus interface is an advanced graphic port (AGP) interface.

24. The I/O node as recited in claim 21, wherein the peripheral bus interface is a peripheral component interconnect (PCI) interface.

* * * * *